US008630621B2

(12) United States Patent
Agashe

(10) Patent No.: US 8,630,621 B2
(45) Date of Patent: Jan. 14, 2014

(54) SYSTEMS AND METHODS TO ENABLE AUTHENTICATION OF THE LOCATION OF ACCESS POINT BASE STATIONS AND/OR USER EQUIPMENT

(75) Inventor: Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 12/571,680

(22) Filed: Oct. 1, 2009

(65) Prior Publication Data
US 2010/0087166 A1 Apr. 8, 2010

Related U.S. Application Data

(60) Provisional application No. 61/102,731, filed on Oct. 3, 2008.

(51) Int. Cl.
H04M 1/66 (2006.01)
(52) U.S. Cl.
USPC ............ 455/411; 455/444; 455/445; 380/270
(58) Field of Classification Search
USPC .................................... 455/411, 445
See application file for complete search history.

(56) References Cited

U.S. PATENT DOCUMENTS

| | | | |
|---|---|---|---|
| 6,591,102 B1 * | 7/2003 | Chavez et al. | 455/435.1 |
| 6,925,566 B1 * | 8/2005 | Feigen et al. | 713/187 |
| 7,613,444 B2 | 11/2009 | Lindqvist et al. | |
| 2003/0166397 A1 * | 9/2003 | Aura | 455/410 |
| 2004/0204097 A1 * | 10/2004 | Scheinert et al. | 455/561 |
| 2005/0148368 A1 * | 7/2005 | Scheinert et al. | 455/561 |
| 2005/0208926 A1 * | 9/2005 | Hamada | 455/410 |
| 2006/0078124 A1 * | 4/2006 | Whelan et al. | 380/273 |
| 2008/0085722 A1 | 4/2008 | Hirano et al. | |
| 2008/0171559 A1 * | 7/2008 | Frank et al. | 455/456.5 |
| 2008/0233946 A1 | 9/2008 | Henry | |

FOREIGN PATENT DOCUMENTS

| | | |
|---|---|---|
| WO | WO2004040938 | 5/2004 |
| WO | WO2009000790 | 12/2008 |

OTHER PUBLICATIONS

International Search Report & Written Opinion—PCT/US09/059440, International Search Authority—European Patent Office—Jan. 27, 2010.
Taiwan Search Report—TW098133609—TIPO—Feb. 22, 2013.

* cited by examiner

*Primary Examiner* — George Eng
*Assistant Examiner* — Joseph Dean, Jr.
(74) *Attorney, Agent, or Firm* — François A. Pelaez

(57) ABSTRACT

Systems and methods for communication include components and methods for detecting, at an access point base station, location-verification data transmitted by at least one macro cell. Further, the components and method include transmitting a response message, including location information, via a backhaul network to a location authentication component to authenticate a location of the access point base station based on the location information, wherein the location information includes location data that is a function of the location-verification data. In some aspects, an operation of the access point base station may be allowed or disallowed based on an authentication of the location information.

36 Claims, 12 Drawing Sheets

SYSTEMS AND METHODS TO ENABLE AUTHENTICATION OF THE LOCATION OF ACCESS POINT BASE STATIONS AND/OR USER EQUIPMENT

CLAIM OF PRIORITY UNDER 35 U.S.C. §119

The present Application for Patent claims priority to Provisional Application No. 61/102,731 entitled "Systems and Methods to Enable Authentication of the Location of Access Point Base Stations and/or User Equipment" filed Oct. 3, 2008, and assigned to the assignee hereof and hereby expressly incorporated by reference herein.

BACKGROUND

Field

The present application relates generally to wireless communications, and more specifically to systems and methods to verify the correct location of base stations, such as, for example, access point base stations or home base stations, and/or user equipment.

BACKGROUND

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged that provides cellular service to a relatively small coverage area. For example, these small base stations may be installed in a user's home or workplace, and provide small area, including indoor, wireless coverage to mobile units using existing broadband Internet connections. Such personal miniature base stations are generally known as access point base stations, or, alternatively, Home Node B (HNB), Home evolved node B (HeNB), or femtocells. Typically, such miniature base stations are connected to the Internet and the mobile operator's network, for example, via DSL router or cable modem. Due to operational restrictions, such as licensed frequencies in given geographical areas, it is desired to restrict operation of an HNB based on a location of the HNB.

Since HNB's can be easily moved, and are largely out of the control of the mobile network operator, there may be difficulty for a mobile operator to control the HNB's operational location. As such, it would be advantageous to verify that a location reported by the HNB is indeed correct. Otherwise, a user may be able to force the HNB to report an incorrect location by inserting appropriate radio signals in the HNB.

Some solutions include having the HNB transmit a signal, and then having surrounding macro cells hear and report this signal to a location authentication server. This alternative appears to have multiple deficiencies. It requires the presence of a downlink receiver at the macro cell, which is not typically supported in macro cell hardware. Moreover, it requires the HNB to transmit before its location can be verified, which runs against the stated goal to prevent the HNB from transmitting until its location can be verified.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of communication comprises detecting, at an access point base station, location-verification data transmitted by at least one macro cell. Further, the method includes transmitting a response message, including location information, via a backhaul network to a location authentication component to authenticate a location of the access point base station based on the location information, wherein the location information includes location data that is a function of the location-verification data.

In another aspect, at least one processor for communication comprises a first module for detecting, at an access point base station, location-verification data transmitted by at least one macro cell. Additionally, the at least one processor includes a second module for transmitting a response message, including location information, via a backhaul network to a location authentication component to authenticate a location of the access point base station based on the location information, wherein the location information includes location data that is a function of the location-verification data.

In a further aspect, a computer program product for communication comprises a computer readable medium comprising a plurality of codes. The plurality of codes includes code for causing a computer to detect, at an access point base station, location-verification data transmitted by at least one macro cell. Additionally, the plurality of codes includes code for causing the computer to transmit a response message, including location information, via a backhaul network to a location authentication component to authenticate a location of the access point base station based on the location information, wherein the location information includes location data that is a function of the location-verification data.

In still another aspect, an access point base station comprises means for detecting location-verification data transmitted by at least one macro cell. Additionally, the access point base station further includes means for transmitting a response message, including location information, via a backhaul network to a location authentication component to authenticate a location of the access point base station based on the location information, wherein the location information includes location data that is a function of the location-verification data.

In another aspect, an access point base station comprises a communications component operable to detect location-verification data transmitted by at least one macro cell. Further, the access point base station includes a processor operable to generate a response message including location information, wherein the location information includes location data that is a function of the location-verification data. Additionally, the communications component is further operable to transmit the response message via a backhaul network to a location authentication component to authenticate a location of the access point base station based on the location information.

In a further aspect, a method of communication comprises receiving a response message including location information from an access point base station at a computer device via a backhaul network. The method also includes determining if a location of the access point base station is authenticated based on the location information and corresponding location-verification data associated with a macro cell, wherein the location is authenticated if the location information includes location data that is a function of the location-verification data.

Additionally, the method includes transmitting an authentication message indicating a result of the determining.

In yet another aspect, at least one processor for communication comprises a first module for receiving a response message including location information from an access point base station at a computer device via a backhaul network. Further, the at least one processor includes a second module for determining if a location of the access point base station is authenticated based on the location information and corresponding location-verification data associated with a macro cell, wherein the location is authenticated if the location information includes location data that is a function of the location-verification data. Additionally, the at least one processor includes a third module for transmitting an authentication message indicating a result of the determining.

In a further aspect, a computer program product for communication comprises a computer readable medium having a plurality of codes. The plurality of codes includes code for causing a computer to receive a response message including location information from an access point base station via a backhaul network. Further, the plurality of codes includes code for causing the computer to determine if a location of the access point base station is authenticated based on the location information and corresponding location-verification data associated with a macro cell, wherein the location is authenticated if the location information includes location data that is a function of the location-verification data. Additionally, the plurality of codes includes code for causing the computer to transmit an authentication message indicating a result of the determining.

In a further aspect, a device for communication comprises means for receiving a response message including location information from an access point base station at a computer device via a backhaul network. Also, the device includes means for determining if a location of the access point base station is authenticated based on the location information and corresponding location-verification data associated with a macro cell, wherein the location is authenticated if the location information includes location data that is a function of the location-verification data. Additionally, the device includes means for transmitting an authentication message indicating a result of the determining.

In still another aspect, a system for communication comprises a location authentication component operable to receive a response message including location information from an access point base station at a computer device via a backhaul network. Also, the system includes a verifier component operable to determine if a location of the access point base station is authenticated based on the location information and corresponding location-verification data associated with a macro cell, wherein the location is authenticated if the location information includes location data that is a function of the location-verification data. Additionally, the system includes a transmitter operable to transmit an authentication message indicating a result of the determining by the verifier component.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
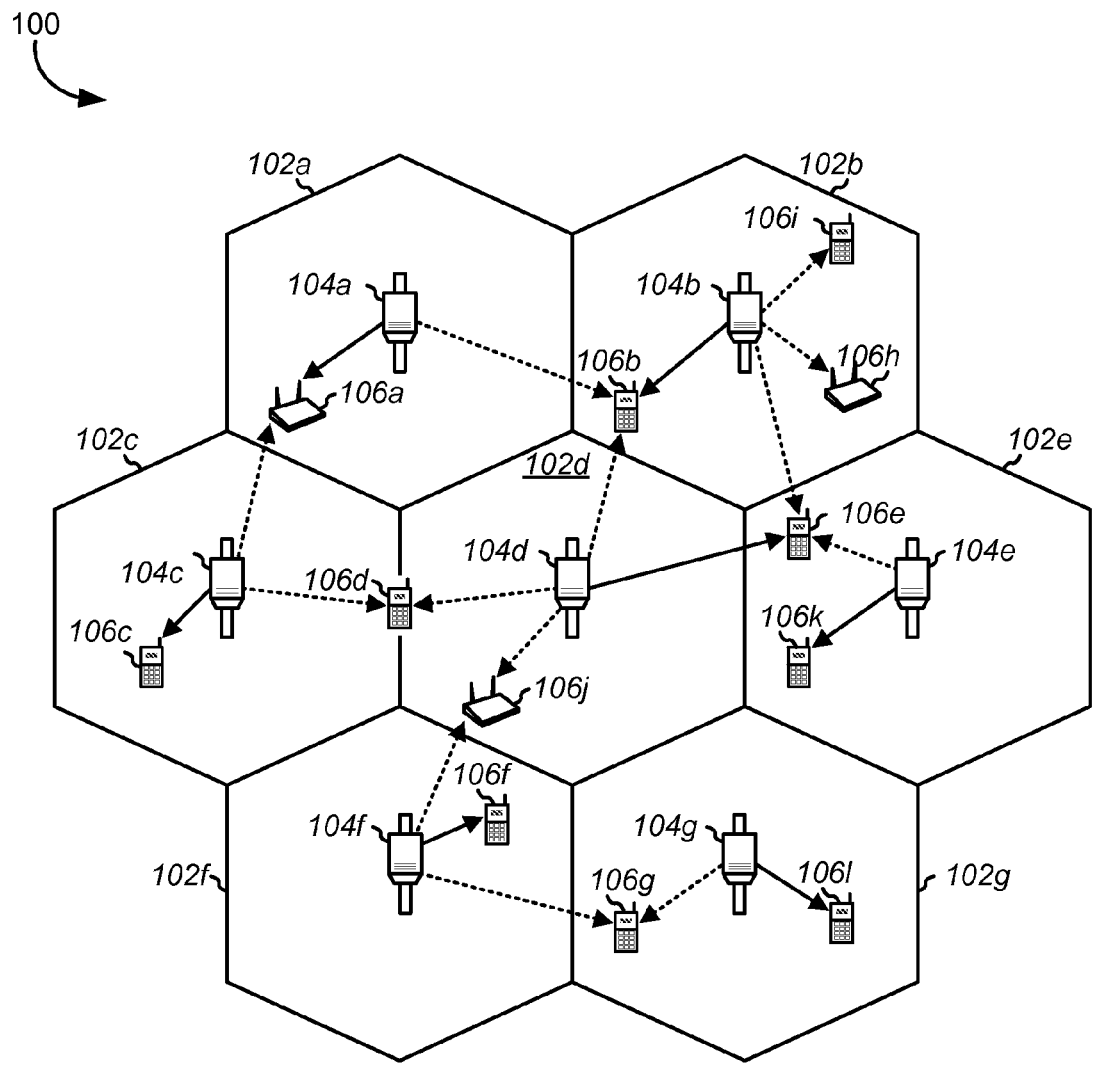
FIG. 1 is a schematic diagram of one aspect of an exemplary wireless communication system incorporating the described aspects.

Various aspects are now described with reference to the drawings. In the following description, for purposes of explanation, numerous specific details are set forth in order to provide a thorough understanding of one or more aspects. It should be noted, however, that such aspect(s) may be practiced without these specific details.

The described aspects relate to systems and methods of controlling a location in which an access point base station, also known as Home Node B (HNB), or Home evolved Node B (HeNB), or femto node, or femtocell is allowed to operate. In general, a mobile network operator is granted a license to operate the mobile network in a given frequency range and in a given geographic area. As an HNB or femtocell is mobile part of the mobile network operator's mobile network, but not in direct control of the mobile network operator, the present aspects provide a system and method to verify a location of the HNB before allowing the HNB to transmit or broadcast a signal over-the-air (OTA). In particular, the present aspects provide random or pseudo-random (PR) data broadcast by one or more macro network base stations in a given geographic area, which can be received by an HNB in the geographic area and utilized in a communication with an authentication component over a backhaul network to verify that the HNB is truly in the geographic area. As the communication is over the backhaul network, and not an OTA communication, any OTA transmission or broadcast by the HNB prior to authorization is avoided. If the location of the HNB is verified, then the HNB may receive an authorization configuration and begin to operate in the geographic area. If the location of the HNB is not verified, then the HNB does not receive an authorization configuration and thus is not allowed to operate. Thus, according to the present aspects, an operating location of an HNB can be controlled by the mobile network operator.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2).

Referring to FIG. 1, an exemplary wireless communication system 100 is configured to support a number of users, in which various disclosed embodiments and aspects may be implemented. By way of example, system 100 provides communication for multiple cells 102, such as, for example, macro cells 102a-102g, with each cell being serviced by a corresponding access point (AP) 104 (such as APs 104a-104g), also known as evolved Node B (eNB). Each cell may be further divided into one or more sectors. Various access terminals (ATs) 106, including ATs 106a-106k, also known interchangeably as user equipment (UE), are dispersed throughout the system. For example, ATs 106 may include cellular phones, such as 106b-g, i, k and l, and Home Node B's (HNB's), Home evolved Node B's (HeNB's), femtocells or access point base stations 106a, h and j. Each AT 106 may communicate with one or more APs 104 on a forward link (FL) and/or a reverse link (RL) at a given moment, for example, depending upon whether the AT is authorized for communication in the respective location, as described herein, and/or whether the AT is active or in soft handoff. The wireless communication system 100 may provide service over a large geographic region, for example, macro cells 102a-102g may cover a few blocks in a neighborhood, whereas the HNB's 106a, h and j provide a relatively smaller service area, such as up to a few hundred meters.

Figure 2:
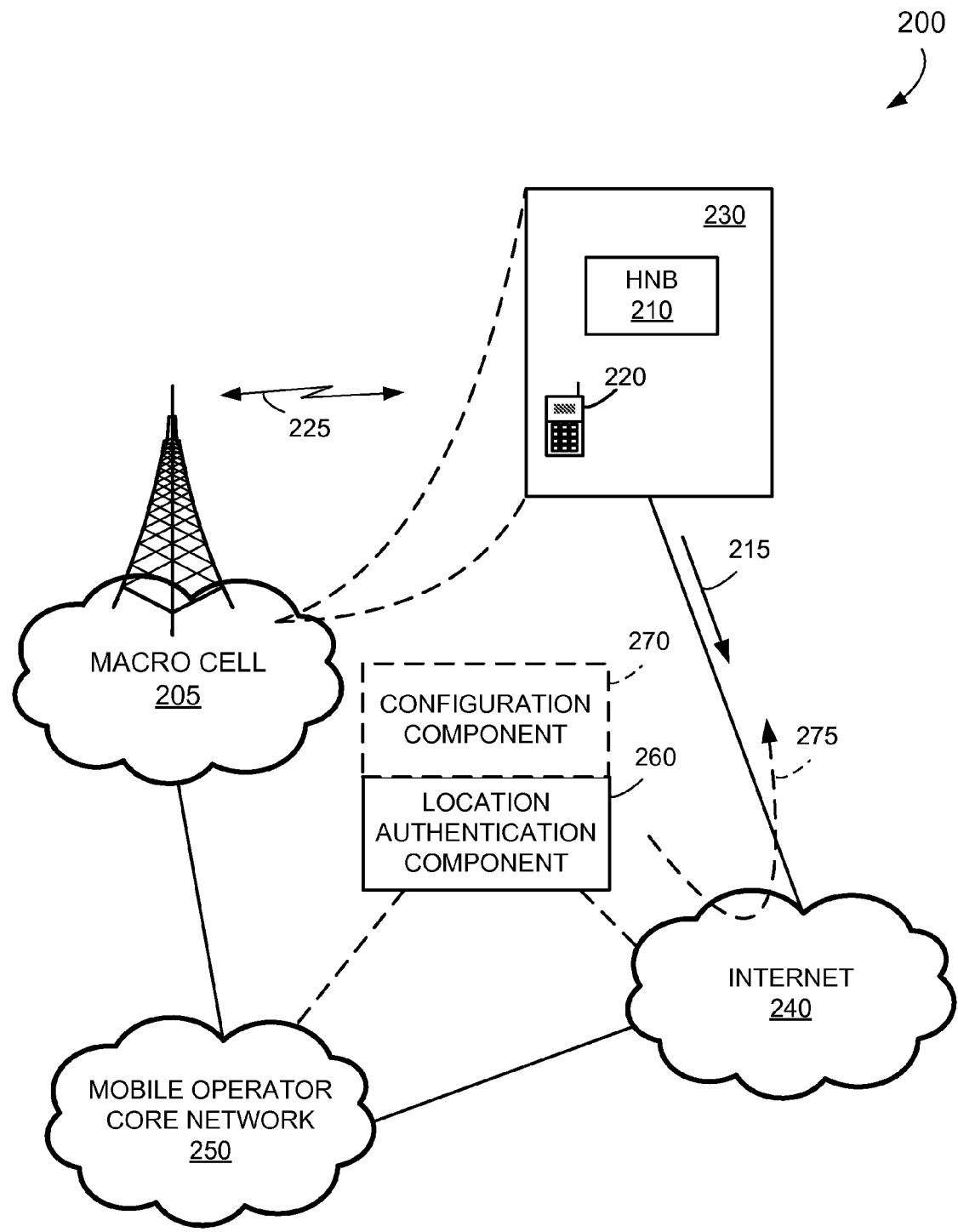
FIG. 2. is a schematic diagram of one aspect a network architecture for deployment of access point base stations within a network environment.

Referring to FIG. 2, an exemplary communication system 200 enables deployment of HNB's or access point base stations within a network environment. In one aspect, the system 200 includes one or more access point base stations or Home Node B units (HNBs), such as HNBs 210, each operable to provide a corresponding small scale network environment 230, such as in one or more user residences, which may be located within a service or coverage area of a macro cell 205. Further, each HNB 210 may be configured to serve associated, as well as alien, user equipment (UE) 220, such as cellular phones. Each HNB 210 is further coupled to the Internet 240 and a mobile operator core network 250 via a wired connection, such as a DSL router or a cable modem. The connection to the Internet 240 and the mobile operator core network 250 may also be referred to as a backhaul connection.

In one aspect, the described aspects control an ability of HNB 210 to operate in a geographic area, such as within a macro cell 205, based on location information 215 provided by the HNB 210 to a location authentication component 260.

In one example, the described aspects only allow HNB 210 to operate in a geographic area where the mobile network operator associated with macro cell 205 and/or core network 250 has a license. In other words, HNB 210 may not be allowed to operate outside a certain location zone (e.g. in a place where the operator does not have spectrum license). For instance, in this example, since HNB 210 is associated with the wireless network of the mobile network operator that is operating macro cell 205 and core network 250, then HNB 210 is also subject to the same or similar licensed frequencies and geographic areas as the mobile network operator. As such, in these aspects, the location authentication component 260 allows/disallows the operation of HNB 210 depending on whether or not location information 215 can be verified to place HNB 210 in an authorized location, such as within macro cell 205.

The aspects described in detail below may prevent the user from being able to trick the HNB into reporting an incorrect location. The aspects may further enable HNB location verification without requiring the HNB to transmit a signal. Furthermore, the aspects may allow HNB location determination without requiring a downlink receiver at the macro cells. Finally, the aspects may allow location verification without communication between the location authentication server and one or more macro cells.

In one embodiment, macro cells 205 transmit location-verification data 225. For example, the location-verification data 225 may be pseudo-random data, which also may be time-varying data that is not predictable. The location-verification data 225 may also be known to, or verifiable by, location authentication component 260. For example, location authentication component 260 may be operable to derive the location-verification data 225 from secret information that is known to the macro cell 205 and the location authentication component 260, where such secret information may be a secret password or identifier, a key, a hash function, or other private information. Alternatively, the location authentication component 260 may be operable to communicate with the macro cell 205 to confirm the location-verification data 225 or some derivative thereof. In one aspect, each macro cell 205 uses different location-verification data 225, while in other aspects the macro cells in a given geographic area or location zone may transmit the same data.

In one aspect, the HNB 210 is configured to hear or receive the location-verification data 225 over-the-air (OTA), and to use it as a challenge to generate a response. The response could simply be an echo of the data, or, in the alternative, could be generated as a function of the challenge, and optionally as a function of one or more of the HNB identity data, macro cell identity data, or a shared secret between HNB 210 and the location authentication component 260. Alternatively, in addition to including the location information 215, the response may include additional information, such as the HNB identity data, the macro cell identity data, etc., which may be used to determine if the HNB is allowed to operate in the network with the macro cell 205. By sending the correct response, the HNB 210 can prove to the location authentication component 260 that it can indeed hear the macro cell 205 over-the-air, thus providing authentication of its location. Further, based on such authentication, either the location authentication component 260 or a configuration component 270 may send an authentication message 275 to HNB 210. In some aspects, the authentication message 275 may indicate that the location is authenticated, thereby allowing HNB 210 to operate, e.g. to transmit over-the-air. Alternatively, or in addition, the authentication message 275 may include configuration parameters, such as channels and RF parameters for use in HNB operations, which may be specific to the given location.

Figure 3:
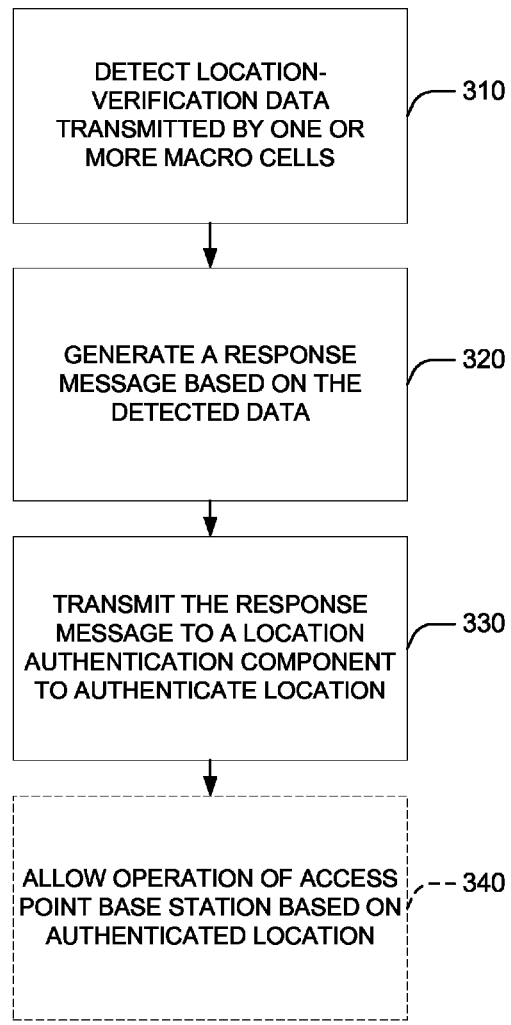
FIG. 3 is a flowchart of one aspect of a method to enable location authentication.

Referring to FIG. 3, a method to enable location authentication and/or location-based HNB operational control, according to one aspect, includes detecting location-verification data transmitted by one or more macro cells at an HNB (Block 410). For example, the data may be pseudo-random data, which may be known to or verifiable by a location authentication component. Further, a response message is generated based on the detected location-verification data (Block 320). Additionally, the response message is transmitted to the location authentication component to authenticate a location of the HNB (Block 330), such as to verify that the HNB is located within an authorized area or predetermined zone, such as within macro cell 205. Optionally, HNB operation may be allowed, including transmission from HNB, based on authentication of the location of the HNB (Block 340).

Figure 4:
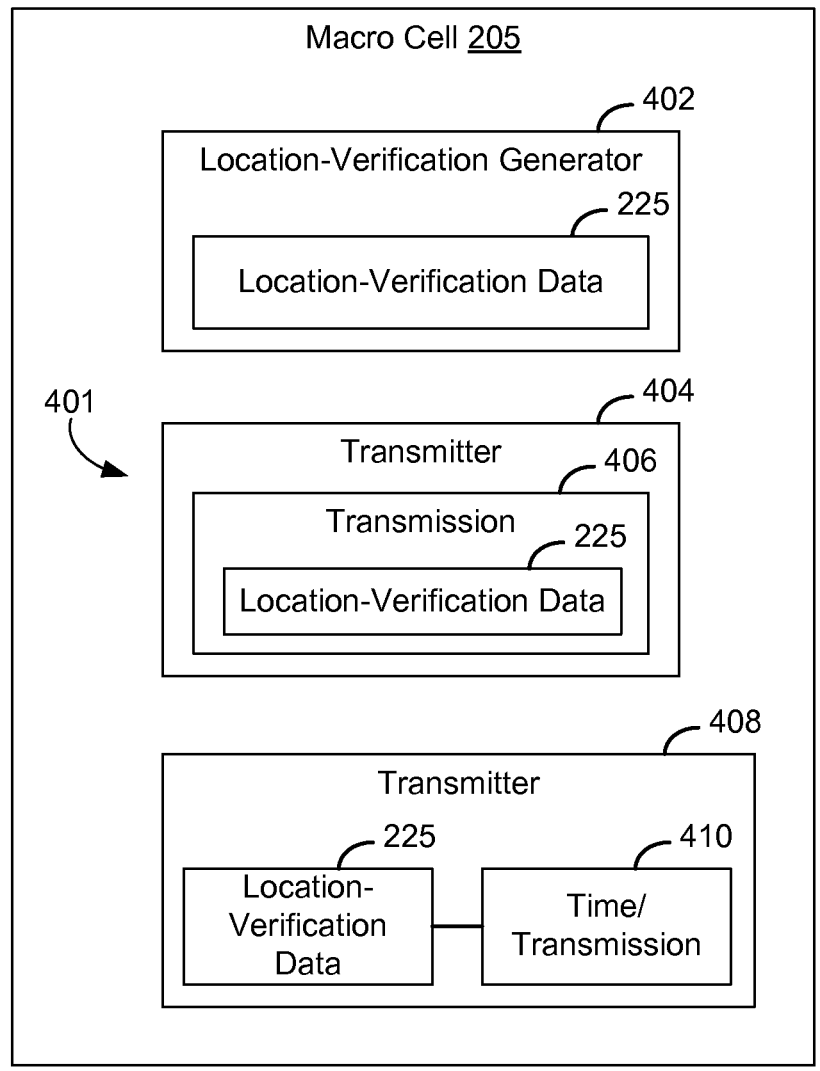
FIG. 4 is a schematic diagram of one aspect of a macro cell of FIG. 2.

Referring to FIG. 4, in one aspect, macro cell 205 may include a computer device configured to perform the functionality of a base station or Node B associated with a wireless network of a mobile network operator. More particularly with regard to the described aspects, macro cell 205 may include a location-verification generator 402 configured to produce location-verification data 225. For example, location-verification generator 402 may include one or any combination of hardware, software, firmware, computer-readable instructions/codes and/or algorithms that are executable to generate pseudo-random data, or time-varying pseudo-random data. For instance, in one example, location-verification generator 402 may generate location-verification data 225 as a function of a shared secret, such as a secret key, and a time-varying input, such as a time. Further, in some aspects, the function of the shared secret and the time-varying input may be further hashed, thereby creating an output representing location-verification data 225.

It should be noted that the rate of change of the time-varying input may be relatively short or relatively long. For example, in some aspects, the location-verification data 225 only needs to change often enough to reduce the threat of an HNB 210 using the location-verification data 225 after having moved out of a given authorized geographic area associated with the location-verification data 225. As such, in some aspects, it may be sufficient for the location-verification data 225 to change, for example, every minute, or every 5 minutes, or every 10 minutes. In other cases, however, it may be desirable to change the location-verification data 225 more rapidly, for example, to decrease the chance that a HNB that has moved quickly to a location where it would not be allowed to transmit may send a response to a challenge that was received over the air in a location where the HNB would have been allowed to transmit.

Additionally, macro cell 205 may include a communications component 401, such as a transmitter 404, for generating a transmission 406, including the location-verification data 225, within the cell or service area of the macro cell 205. For example, in some aspects, transmitter 404 may transmit location-verification data 225 on its own in the transmission 406, or in other aspects, transmitter 404 may include location-verification data 225 in with other data in the transmission 406. For instance, in one example, location-verification data 225 may form part of a pilot signal transmission that is generated by transmitter 404. Transmission 406 may be a broadcast or a unicast or a multicast transmission.

Additionally, the location verification data may be generated by a centralized server and distributed to the location authentication component as well as the macro cell(s) in a given geographical region. Such server may or may not be collocated with the location authentication component.

In some optional aspects, macro cell 205 may further include a verifier component 408 configured to verify the location-verification data 225 associated with a respective time/transmission 410 for the location authentication component 260 (FIG. 2). For example, verifier component 408 may include one or any combination of hardware, software, firmware, computer-readable instructions/codes and/or algorithms that are executable to verify location-verification data 225. For example, if location authentication component 260 (FIG. 2) does not receive transmission 406 of location-verification data 225, or is not able to derive location-verification data 225 associated with a given transmission 406, then location authentication component 260 may send a request to macro cell 205 and/or verifier component 408 to confirm what location-verification data 225 was sent at what time or in what transmission 410.

Figure 5:
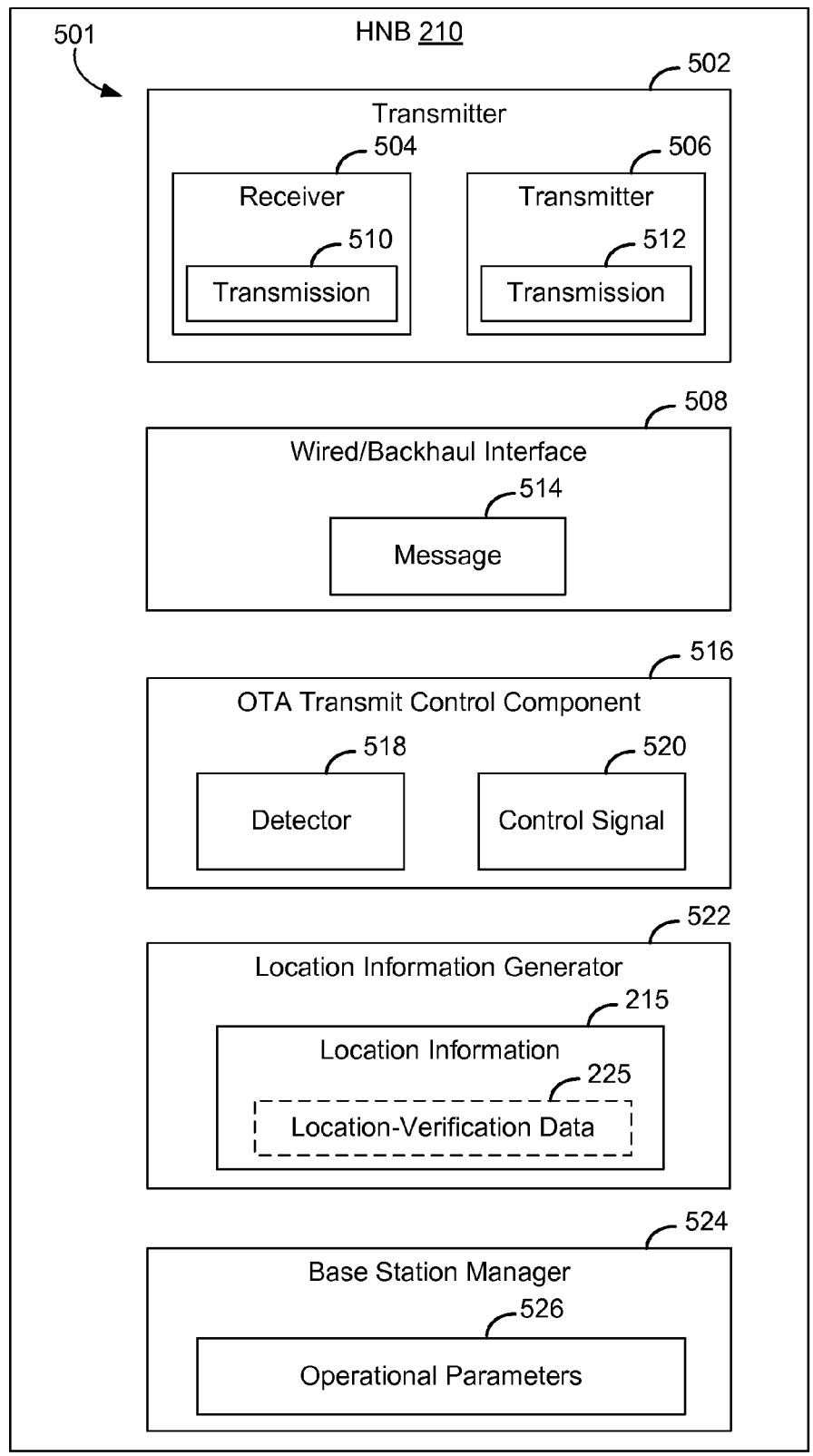
FIG. 5 is a schematic diagram of one aspect of an HNB of FIG. 2.

Referring to FIG. 5, HNB 210 may include a computer device configured to perform the functionality of an access point base station, femto cell or Home Node B associated with a wireless network of a mobile network operator. More particularly with regard to the described aspects, HNB 210 may include a communications component 501 with an over-the-air interface or transceiver 502 having a receiver 504 and a transmitter 506, and a wired or backhaul interface 508. For example, receiver 504 is configured to receive over-the-air transmissions 510, such as transmission 406 including location-verification data 225 from macro cell 205, or other communications-related transmissions from AT's 106 operating in the service or coverage area of HNB 210. Furthermore, transmitter 506 is configured to generate over-the-air transmissions 512, such as pilot signal broadcasts in the service or coverage area of HNB 210, or communication message transmissions, such as pages, calls, or text messages, for receipt by UEs (FIG. 1) operating in the service or coverage area of HNB 210. Wired or backhaul interface 508 is connected by a wired or wireline connection to Internet 240 (FIG. 2) and/or mobile operator core network 250 (FIG. 2). Wired or backhaul interface 508 is configured to send or receive messages 514, such as location challenge responses, location verification decision messages and authorization configuration messages, to other networked entities, such a location authentication component 260 and/or configuration component 270.

Further, HNB 210 includes an over-the-air transmit control component 516 configured to manage an ability of HNB 210 to generate over-the-air transmissions 512. For example, transmit control component 516 may include one or any combination of hardware, software, firmware, computer-readable instructions/codes and/or algorithms that are executable to allow or disallow the operation of transmitter 506, for example, based on whether or not a location of HNB 210 has been verified and/or based on whether HNB 210 has received an authentication message 275 (FIG. 2) with operating parameters for a given geographic area. As such, transmit control component 516 is in communication with communications components 501, and may include a detector component 518 for monitoring whether or not a location of HNB 210 has been verified and/or whether HNB 210 has received an authentication message 275, and/or for monitoring whether or not over-the-air interface 502 is operating. Further, transmit control component 516 may be configured to generate a control signal 520 that commands over-the-air interface 502 to operate or to not operate.

Additionally, HNB 210 may include a location information generator 522 configured to generate location information 215 for transmission to location authentication component 260 (FIG. 2) for verification of a location of HNB 210. For example, location information generator 522 may include one or any combination of hardware, software, firmware, computer-readable instructions/codes and/or algorithms that are executable to obtain and utilize location-verification data 225 to generate location information 215. As noted above, location information 215 may comprise location-verification data 225 or may include data that is a function of location-verification data 225. For instance, location information generator 522 may apply a shared secret, such as a key, with location authentication component 260 to location-verification data 225 in order to generate location information 215 that is secure for transmission.

Also, HNB 210 includes a base station manager component 524 to control operations of HNB 210 as an access point base station or femto cell. For example, base station manager component 524 may include one or any combination of hardware, software, firmware, computer-readable instructions/codes and/or algorithms that are executable to obtain and utilize operational parameters 524 from, for example, authentication message 275 or any other messages received by HNB 210 authorizing operation of the over-the-air interfaces 502. For instance, operational parameters 524 may include, but are note limited to, parameters such as permitted channels/frequencies, pilot codes, registration area to advertise, Quality of Service (QoS) parameters, and any other parameters for use in operating HNB 210, some of which may be location-specific, for example, due to licensing restrictions or due to interoperability considerations with adjacent or overlapping networks.

Figure 6:
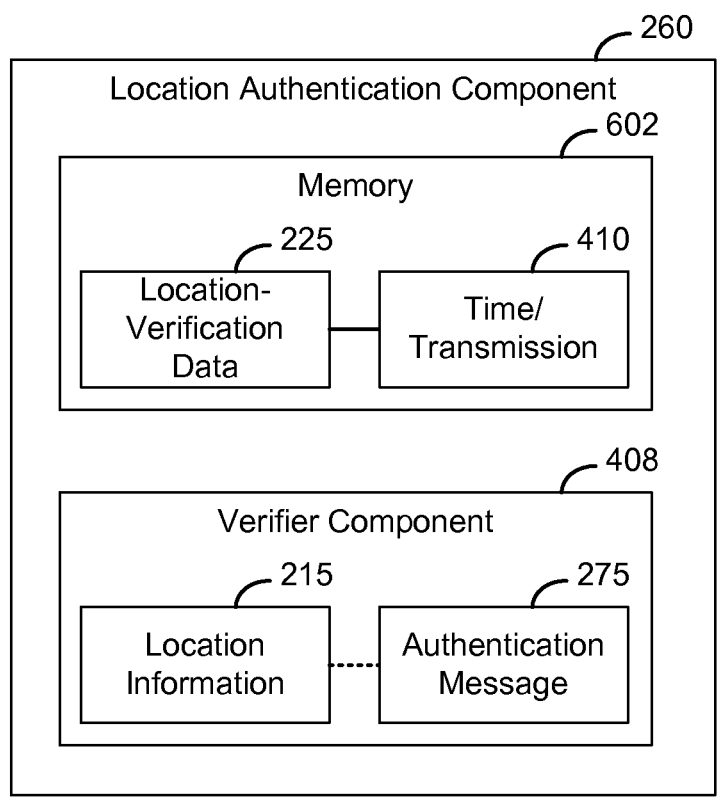
FIG. 6 is a schematic diagram of one aspect of a location authentication component of FIG. 2.

Referring to FIG. 6, location authentication component 260 may include a computer device that may be configured to determine or verify whether or not received location information 215 represents a valid or true location of HNB 210. For example, location authentication component 260 may include one or any combination of hardware, software, firmware, computer-readable instructions/codes and/or algorithms that are executable to compare location information 215 with valid location-verification data 225, or a function thereof, to determine if there is a match, or to forward the location information 215 to macro cell 205 or some other network component to perform a similar verification. As such, in some aspects, location authentication component 260 includes a memory 602 having location-verification data 225 associated with a respective time/transmission 410, and a verifier component 604 configured to authenticate the location information 215 with respect to the location-verification data 225 associated with a respective time/transmission 410. For example, verifier component 604 may compare received location information 215, or may derive location-verification data therefrom, and compare such information with the stored, valid location-verification data 225 in memory 602.

Alternatively, if location authentication component 260 (FIG. 2) does not know location-verification data 225, does not receive transmission 406 of location-verification data 225, or is otherwise not able to derive location-verification data 225 associated with a given transmission 406, then location authentication component 260 may send a request to macro cell 205 and/or verifier component 408 to confirm what location-verification data 225 was sent at what time or in what transmission 410.

In any case, verifier component 604 is configured to generate authentication message 275, which may indicate whether or not a location of the respective HNB 210 is verified based on the comparison of the received location information 215 with valid location-verification data 225, or a function thereof, or which may provide configuration parameters for use in operation of HNB 210. Authentication message 275 may be transmitted to HNB 210 to control operation of over-the-air interface 502, or authentication message 275 may be forwarded to configuration component 270 to trigger generation of operational parameters for inclusion in authentication message 275 prior to sending to HNB 210.

Figure 7:
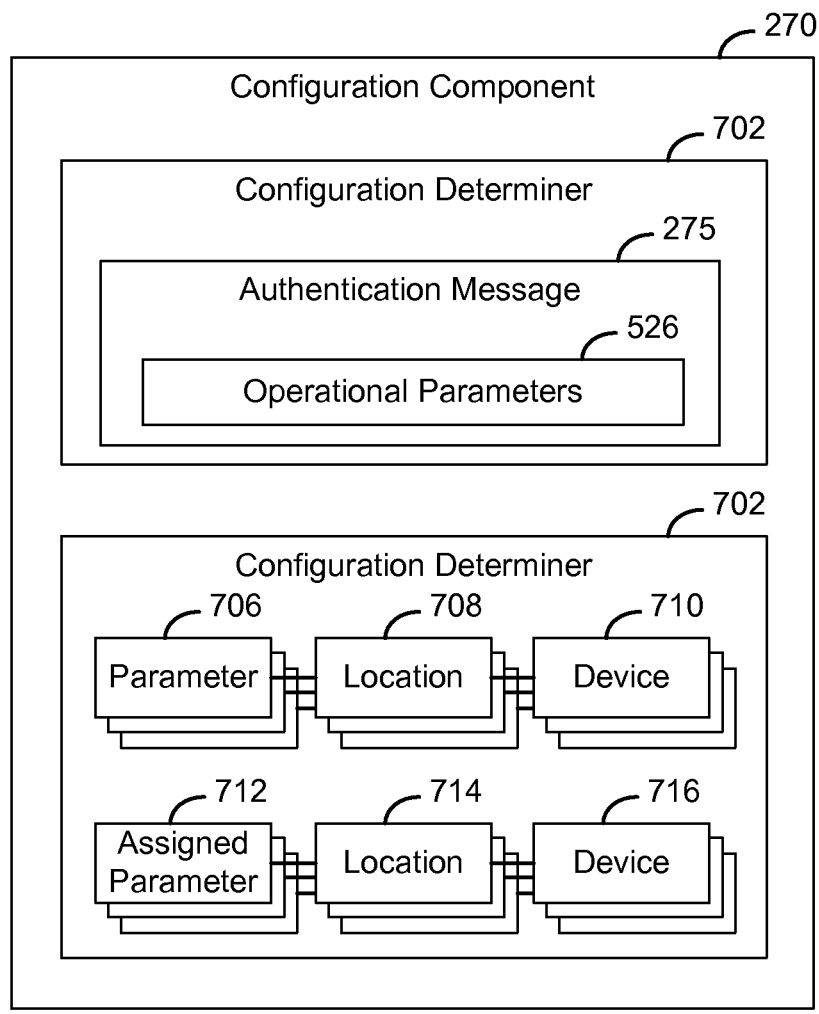
FIG. 7 is a schematic diagram of one aspect of a configuration component of FIG. 2.

Referring to FIG. 7, configuration component 270 may be independent from, or integral with, location authentication component 260. For example, location authentication component 260 and configuration component 270 may be one network device or may be separate network devices. Configuration component 270 may include one or any combination of hardware, software, firmware, computer-readable instructions/codes and/or algorithms that are executable to generate operational parameters 526 to control operation of an authenticated HNB 210, wherein such parameters may be location-specific. In some aspects, configuration component 270 may include a configuration determiner 702 operable to generate operational parameters 526 for a given HNB, and optionally with respect to a given location or geographic area. For example, configuration determiner 702 may access a parameters database 704 operable to store relationships between available operational parameters 706 and corresponding locations 708, and optionally corresponding devices 710 for which such parameters may be valid, as well as relationships between already assigned parameters 712 and corresponding locations 714, and optionally corresponding devices 716 to which such parameters have been assigned. As such, configuration determiner 702 attempts to find valid parameter for a given location, such as a location corresponding to macro cell 205, and optionally to match such parameters with a capability of a given device. Further, configuration determiner 702 may compare potentially valid parameters that may be assigned to HNB 210 to already assigned parameters 712 in adjacent locations and select a set of operational parameters 526 having a least likelihood of causing interference with existing assignments. Thus, configuration determiner 702 may generate operational parameters 526 for inclusion in authentication message 275, which may be forwarded to HNB 210 if the location of the HNB has been authenticated.

Figure 8:
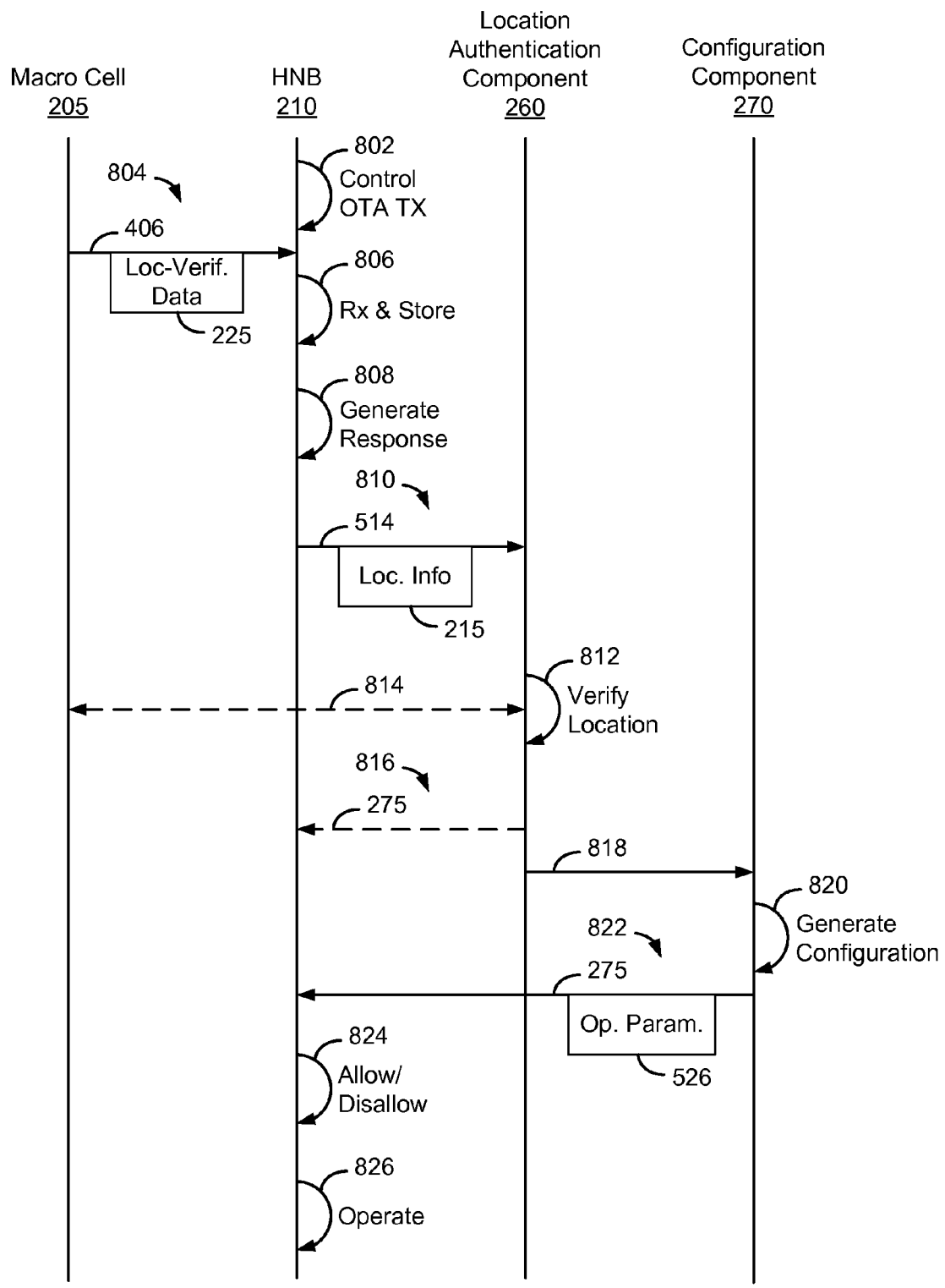
FIG. 8 is a message flow diagram of one aspect of an operation of the system of FIG. 2.

Referring to FIG. 8, in one aspect of an operation of system 200 of FIG. 2, HNB 210 is configured to control operation of access point base station capabilities, such as an over-the-air transmission, based on whether or not the HNB has an authenticated location (Act 802). At act 804, macro cell 205 transmits a transmission 406 that includes location-verification data 225 over-the-air, which is received and stored by HNB 210 at act 806. In response to the detection and receipt of transmission 406 including location-verification data 225, which may be considered a challenge, the HNB 210 generates a response at act 808, which includes location information 215 comprising, or generated as a function of, location-verification data 225, and the response is forwarded in transmission 514 via a wired or backhaul connection to location authentication component 260 at act 810.

At act 812, location authentication component 260 authenticates or verifies if location information 215 is valid, for example, by confirming whether or not location-verification data included in or derived from the location information 215 matches known, valid location-verification data 225. In some optional aspects, at act 814 (which may also occur at any earlier time), location authentication component 260 may communicate with macro cell 205 to confirm the location-verification data 225, such as by receiving the location-verification data 225 or a shared secret with which to derive the location-verification data 225, or to obtain verification directly from macro cell 205 or some other trusted network component. In any case, in one optional aspect, at act 816, location authentication component 260 may forward an authentication message 275 to HNB 210 to indicate whether or not a location of the HNB 201 is authenticated. Alternatively, at act 818, location authentication component 260 may send a message indicating that the location is authenticated to configuration component 270, which is then triggered, at act 820, to generate an authorized configuration including operational parameters 526. At act 822, configuration component 270 may then forward authentication message 275 including the operational parameters 526 to the location-authenticated HNB 210.

At act 824, upon receiving authentication message 275 at act 816 or at act 822, HNB 210 controls over-the-air transmissions, either allowing or disallowing such access point base station functionality depending on the content of authentication message 275. At act 826, assuming authentication message 275 verifies that the location of HNB 210 is valid, then the HNB 210 initiates operations as an access point base station, which may include operating according to any received operational parameters 526.

Figure 9:
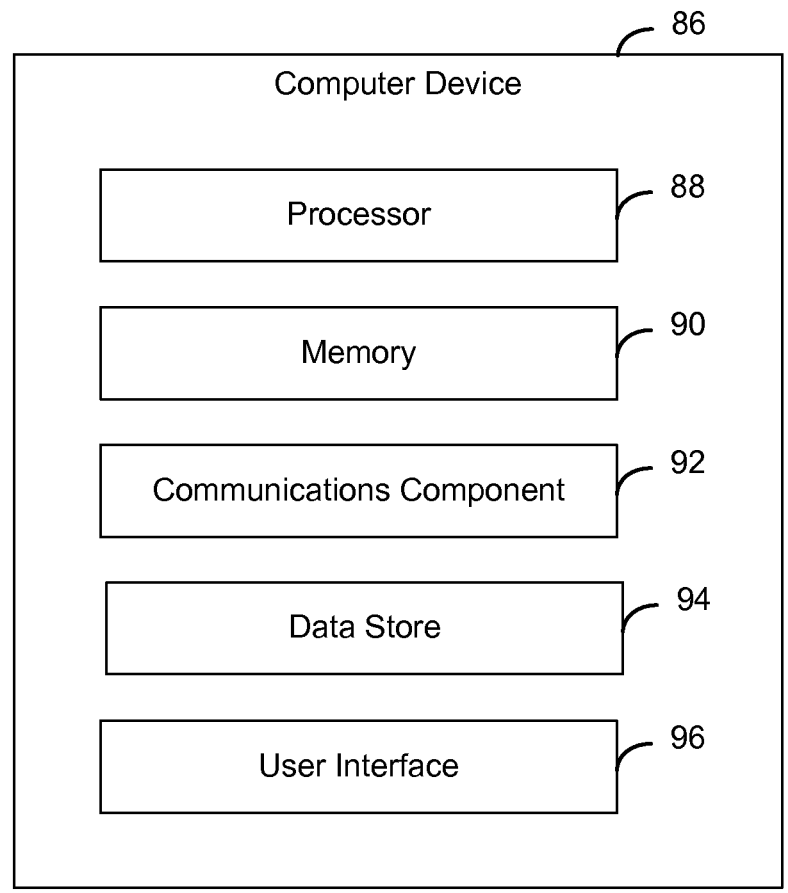
FIG. 9 is a schematic diagram of a computer device that may implement one or more of the described aspects.

Referring to FIG. 9, in one aspect, any of macro cell 205, HNB 210, location authentication component 260 and configuration component 270 (FIG. 1) may be implemented by computer device 86 that may further include the specific components discussed above with respect to these devices/components. Computer device 86 includes a processor 88 for carrying out processing functions associated with one or more of components and functions of the respective aspects, as described herein. Processor 88 can include a single or multiple set of processors or multi-core processors. Moreover, processor 88 can be implemented as an integrated processing system and/or a distributed processing system.

Computer device 86 further includes a memory 90, such as for storing local versions of applications being executed by processor 88. Memory 90 can include any type of memory usable by a computer, such as random access memory (RAM), read only memory (ROM), tapes, magnetic discs, optical discs, volatile memory, non-volatile memory, and any combination thereof.

Further, computer device 86 includes a communications component 92 that provides for establishing and maintaining communications with one or more parties utilizing hardware, software, and services as described herein. Communications component 94 may carry communications between components on computer device 86, as well as between computer device 86 and external devices, such as devices located across a wireless communications network and/or devices serially or locally connected via a wired connection to computer device 86. For example, communications component 86 may include one or more buses, and may further include transmit chain components and receive chain components associated with a transmitter and receiver, respectively, or a transceiver, operable for interfacing with external devices.

Additionally, computer device 86 may further include a data store 94, which can be any suitable combination of hardware and/or software, that provides for mass storage of information, databases, and programs employed in connection with aspects described herein. For example, data store 94 may be a data repository for applications and data not currently being executed by processor 88.

Computer device 86 may additionally include a user interface component 96 operable to receive inputs from a user of computer device 86, and further operable to generate outputs for presentation to the user. User interface component 96 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 96 may include one or more output devices, including but not limited to a display, a speaker, a haptic feedback mechanism, a printer, any other mechanism capable of presenting an output to a user, or any combination thereof.

Figure 10:
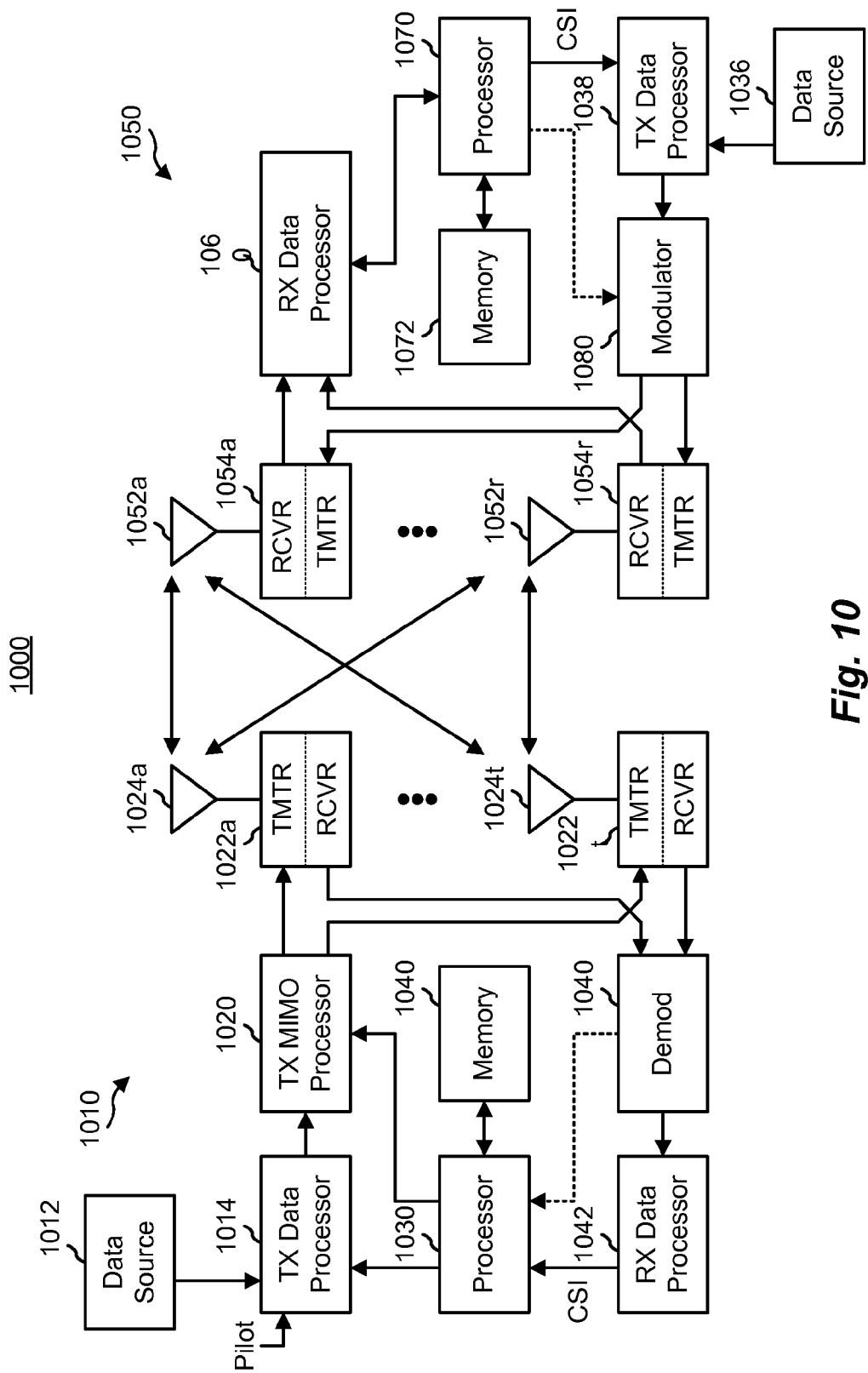
FIG. 10 is a schematic diagram of a transmitter and a receiver operable to implement the described aspects.

FIG. 10 is an example wireless communication system 1000 that may incorporate the aspects described herein. The wireless communication system 1000 depicts one base station/forward link transmitter 1010 and one mobile device 1050 for sake of brevity. However, it is to be appreciated that system 1000 can include more than one base station/forward link transmitter and/or more than one mobile device, wherein additional base stations/transmitters and/or mobile devices can be substantially similar or different from example base station/forward link transmitters 1010 and mobile device 1050 described below. In addition, it is to be appreciated that base station/forward link transmitter 1010 and/or mobile device 1050 can employ the systems, configurations, and/or methods described herein to facilitate wireless communication there between.

At base station/forward link transmitter 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station/forward link transmitter 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station/forward link transmitter 1010.

At base station/forward link transmitter 1010, the modulated signals from mobile device 1050 can be received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights. It is to be appreciated that in the case of a forward link transmitter 1010, as opposed to a base station, these RX components may not be present since data is only broadcasted over the forward link.

Processors 1030 and 1070 can direct (e.g., control, coordinate, manage, etc.) operation at base station/forward link transmitter 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
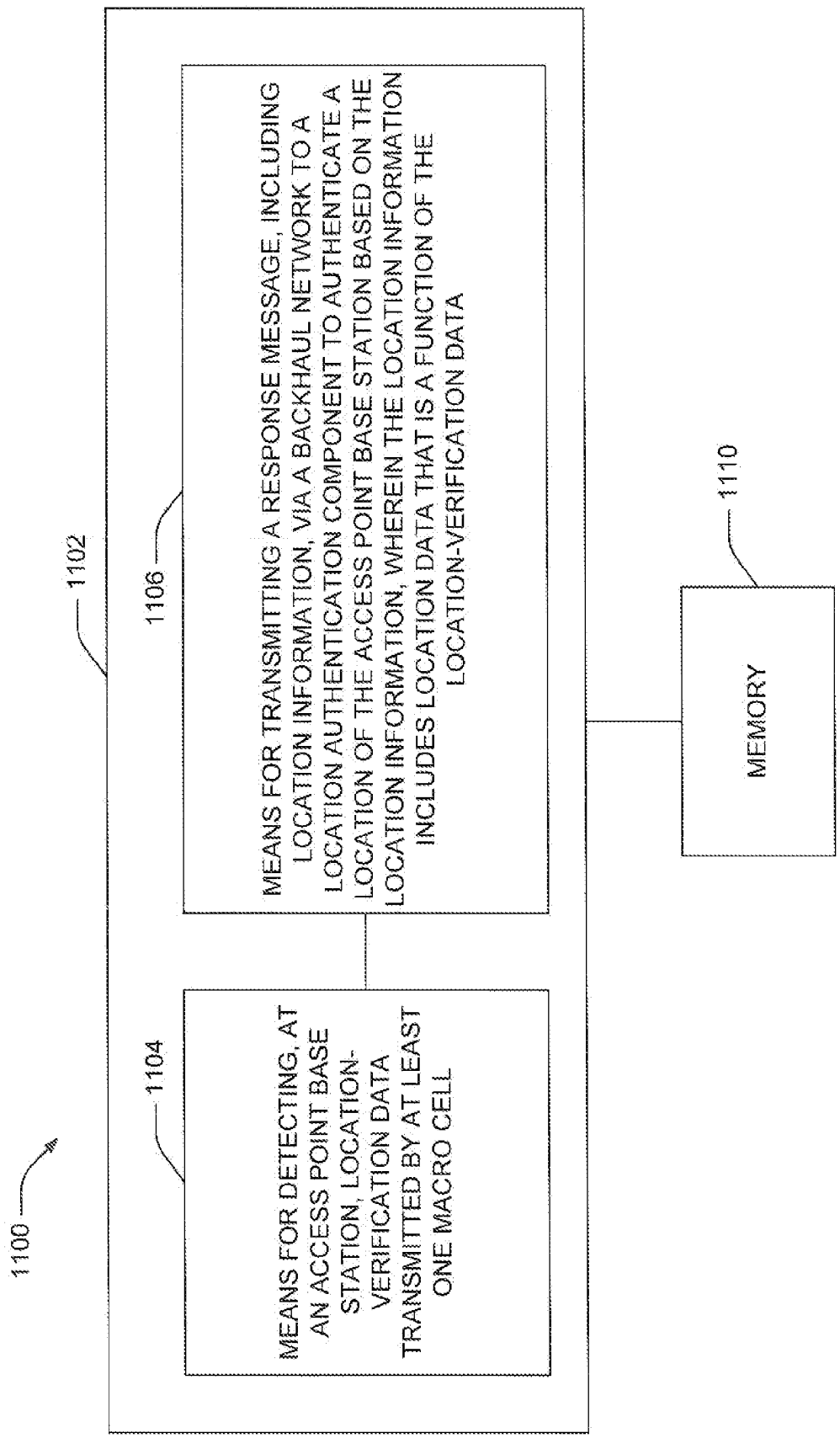
FIG. 11 is a schematic diagram of one aspect of a system to provide proof of a location.

Referring to FIG. 11, a system 1100 for communication to provide proof of a location, such system being able to reside at least partially within a mobile device, such as an access point base station or HNB. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include means for detecting, at an access point base station, location-verification data transmitted by at least one macro cell 1104. Further, logical grouping 1102 can comprise means for transmitting a response message, including location information, via a backhaul network to a location authentication component to authenticate a location of the access point base station based on the location information, wherein the location information includes location data that is a function of the location-verification data 1106.

Additionally, system 1100 can include a memory 1110 that retains instructions for executing functions associated with electrical components 1104 and 1106. While shown as being external to memory 1110, it is to be understood that one or more of electrical components 1104 and 1106 can exist within memory 1110.

Figure 12:
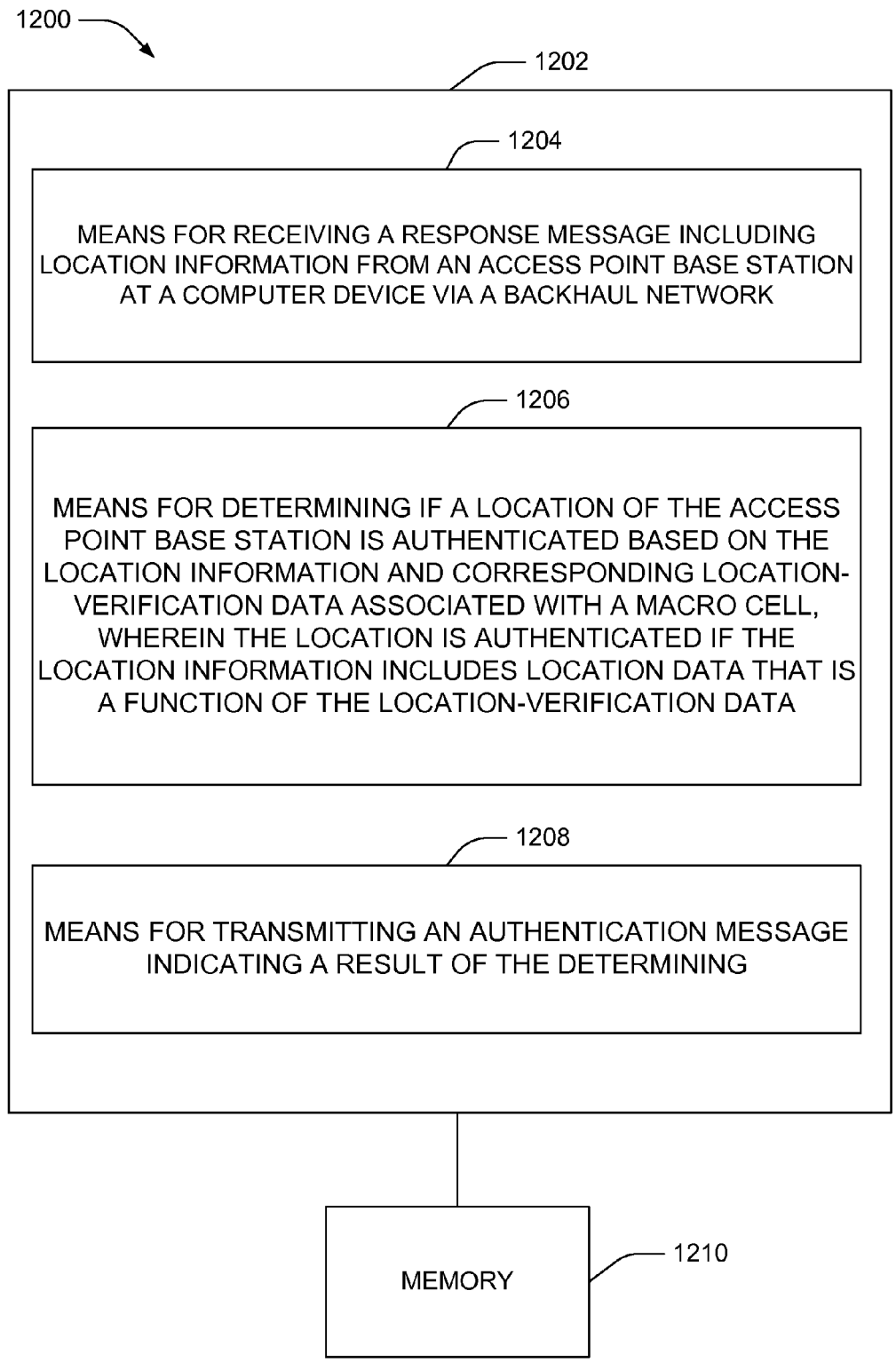
FIG. 12 is a schematic diagram of one aspect of a system to authenticate location information.

Referring to FIG. 12, a system 1200 for communication to authenticate location information, which can reside at least partially within a network device, such as an location authentication component. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include means for receiving a response message including location information from an access point base station at a computer device via a backhaul network 1204. Further, logical grouping 1202 can comprise means for determining if a location of the access point base station is authenticated based on the location information and corresponding location-verification data associated with a macro cell, wherein the location is authenticated if the location information includes location data that is a function of the location-verification data 1206. Additionally, logical grouping 1202 can include means for transmitting an authentication message indicating a result of the determining 1208.

Additionally, system 1200 can include a memory 1210 that retains instructions for executing functions associated with electrical components 1204, 1206 and 1208. While shown as being external to memory 1210, it is to be understood that one or more of electrical components 1204, 1206 and 1208 can exist within memory 1210.

While the specification describes particular examples of the present invention, those of ordinary skill can devise variations of the present invention without departing from the inventive concept.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. Additionally, in some aspects, the steps and/or actions of a method or algorithm may reside as one or any combination or set of codes and/or instructions on a machine readable medium and/or computer readable medium, which may be incorporated into a computer program product.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of communication, comprising:
    detecting, at an access point base station, location-verification data transmitted by at least one macro cell; and
    transmitting a response message, including location information, via a backhaul network to a location authentication component to authenticate a location of the access point base station based on the location information,
    wherein the location information includes location data that is a function of the location-verification data,
    wherein the location-verification data comprises time-varying, pseudo-random data that is verifiable by the location authentication component,
    wherein a rate of change of the time-varying, pseudo-random data decreases when the location of the access point base station is within a geographical area associated with the location-verification data, and
    wherein the rate of change of the time-varying, pseudo-random data increases when the location of the access point base station is outside the geographical area associated with the location-verification data.

2. The method of claim 1, further comprising generating the response message based on the detected location-verification data.

3. The method of claim 1, further comprising preventing an over-the-air transmission by the access point base station prior to authenticating the location of the access point base station.

4. The method of claim 1, further comprising:
    receiving an authentication message comprising configuration data for operating in the location if the location information corresponds to the location-verification data of the at least one macro cell; and
    enabling the access point base station for operation using the configuration data.

5. The method of claim 4, wherein transmitting the response message further comprises including an access point base station identifier, and wherein receiving the authentication message is further based on confirming, according to the access point base station identifier, that the access point base station is allowed to operate in a network with the macro cell.

6. The method of claim 1, further comprising:
preventing an over-the-air transmission by the access point base station prior to authenticating the location of the access point base station;
receiving an authentication message comprising configuration data for operating in the location if the location information corresponds to the location-verification data of the at least one macro cell; and
enabling the access point base station for operation using the configuration data, or continuing the preventing of the over-the-air transmission if the authentication message is not received.

7. The method of claim 1, wherein the location information comprises the location-verification data.

8. At least one processor for communication, comprising:
a first module, comprising hardware, for detecting, at an access point base station, location-verification data transmitted by at least one macro cell; and
a second module for transmitting a response message, including location information, via a backhaul network to a location authentication component to authenticate a location of the access point base station based on the location information,
wherein the location information includes location data that is a function of the location-verification data,
wherein the location-verification data comprises time-varying, pseudo-random data that is verifiable by the location authentication component,
wherein a rate of change of the time-varying, pseudo-random data decreases when the location of the access point base station is within a geographical area associated with the location-verification data, and
wherein the rate of change of the time-varying, pseudo-random data increases when the location of the access point base station is outside the geographical area associated with the location-verification data.

9. The at least one processor of claim 8, further comprising a third module for preventing an over-the-air transmission by the access point base station prior to authenticating the location of the access point base station.

10. A computer program product comprising a non-transitory computer readable medium including program code stored thereon, the program code for communication, comprising: a computer readable medium, comprising:
code for causing a computer to detect, at an access point base station, location-verification data transmitted by at least one macro cell; and
code for causing the computer to transmit a response message, including location information, via a backhaul network to a location authentication component to authenticate a location of the access point base station based on the location information,
wherein the location information includes location data that is a function of the location-verification data,
wherein the location-verification data comprises time-varying, pseudo-random data that is verifiable by the location authentication component,
wherein a rate of change of the time-varying, pseudo-random data decreases when the location of the access point base station is within a geographical area associated with the location-verification data, and
wherein the rate of change of the time-varying, pseudo-random data increases when the location of the access point base station is outside the geographical area associated with the location-verification data.

11. The computer program product of claim 10, further comprising code for causing the computer to prevent an over-the-air transmission by the access point base station prior to authenticating the location of the access point base station.

12. An access point base station, comprising:
means for detecting location-verification data transmitted by at least one macro cell; and
means for transmitting a response message, including location information, via a backhaul network to a location authentication component to authenticate a location of the access point base station based on the location information,
wherein the location information includes location data that is a function of the location-verification data,
wherein the location-verification data comprises time-varying, pseudo-random data that is verifiable by the location authentication component,
wherein a rate of change of the time-varying, pseudo-random data decreases when the location of the access point base station is within a geographical area associated with the location-verification data, and
wherein the rate of change of the time-varying, pseudo-random data increases when the location of the access point base station is outside the geographical area associated with the location-verification data.

13. The access point base station of claim 12, further comprising means for preventing an over-the-air transmission by the access point base station prior to authenticating the location of the access point base station.

14. An access point base station, comprising:
a communications component operable to detect location-verification data transmitted by at least one macro cell; and
a processor operable to generate a response message including location information, wherein the location information includes location data that is a function of the location-verification data,
wherein the communications component is further operable to transmit the response message via a backhaul network to a location authentication component to authenticate a location of the access point base station based on the location information,
wherein the location-verification data comprises time-varying, pseudo-random data that is verifiable by the location authentication component,
wherein a rate of change of the time-varying, pseudo-random data decreases when the location of the access point base station is within a geographical area associated with the location-verification data, and
wherein the rate of change of the time-varying, pseudo-random data increases when the location of the access point base station is outside the geographical area associated with the location-verification data.

15. The access point base station of claim 14, wherein the processor is further operable to generate the response message based on the detected location-verification data.

16. The access point base station of claim 14, further comprising a transmission control component operable to prevent an over-the-air transmission by the access point base station prior to authenticating the location of the access point base station.

17. The access point base station of claim 14, further comprising:
- wherein the communications component is further operable to receive an authentication message comprising configuration data for operating in the location if the location information corresponds to the location-verification data of the at least one macro cell; and
- wherein the processor is further operable to enable the access point base station for operation using the configuration data.

18. The access point base station of claim 17, wherein the response message further comprises an access point base station identifier, and wherein the authentication message is further based on confirming, according to the access point base station identifier, that the access point base station is allowed to operate in a network with the macro cell.

19. The access point base station of claim 14, further comprising:
- a transmission control component operable for preventing an over-the-air transmission by the access point base station prior to authenticating the location of the access point base station;
- wherein the communications component is further operable for receiving an authentication message comprising configuration data for operating in the location if the location information corresponds to the location-verification data of the at least one macro cell; and
- wherein the processor is further operable for enabling the access point base station for operation using the configuration data, or continuing the preventing of the over-the-air transmission if the authentication message is not received.

20. The access point base station of claim 14, wherein the location information comprises the location-verification data.

21. A method of communication, comprising:
- receiving, at a location authentication component, a response message including location information from an access point base station at a computer device via a backhaul network;
- determining if a location of the access point base station is authenticated based on the location information and corresponding location-verification data associated with a macro cell, wherein the location is authenticated if the location information includes location data that is a function of the location-verification data; and
- transmitting an authentication message indicating a result of the determining,
- wherein the location-verification data comprises time-varying, pseudo-random data that is verifiable by the location authentication component,
- wherein a rate of change of the time-varying, pseudo-random data decreases when the location of the access point base station is within a geographical area associated with the location-verification data, and
- wherein the rate of change of the time-varying, pseudo-random data increases when the location of the access point base station is outside the geographical area associated with the location-verification data.

22. The method of claim 21, wherein the authentication message is configured to allow or disallow an over-the-air transmission by the access point base station based on whether or not the location is authenticated.

23. The method of claim 21, further comprising:
- generating an authentication message comprising configuration data for operating in the location if the location information corresponds to the location-verification data of the at least one macro cell; and
- transmitting the authentication message to the access point base station, wherein the authentication message operates to enable the access point base station for operation using the configuration data.

24. The method of claim 21, wherein receiving the response message further comprises receiving an access point base station identifier, and wherein generating the authentication message is further based on confirming, according to the access point base station identifier, that the access point base station is allowed to operate in a network with the macro cell.

25. The method of claim 21, wherein the location information comprises the location-verification data.

26. At least one processor for communication, comprising:
- a first module, comprising hardware, for receiving, at a location authentication component, a response message including location information from an access point base station at a computer device via a backhaul network;
- a second module for determining if a location of the access point base station is authenticated based on the location information and corresponding location-verification data associated with a macro cell, wherein the location is authenticated if the location information includes location data that is a function of the location-verification data; and
- a third module for transmitting an authentication message indicating a result of the determining,
- wherein the location-verification data comprises time-varying, pseudo-random data that is verifiable by the location authentication component,
- wherein a rate of change of the time-varying, pseudo-random data decreases when the location of the access point base station is within a geographical area associated with the location-verification data, and
- wherein the rate of change of the time-varying, pseudo-random data increases when the location of the access point base station is outside the geographical area associated with the location-verification data.

27. The at least one processor of claim 26, further comprising:
- a fourth module for generating an authentication message comprising configuration data for operating in the location if the location information corresponds to the location-verification data of the at least one macro cell; and
- wherein the third module is further operable for transmitting the authentication message to the access point base station, wherein the authentication message operates to enable the access point base station for operation using the configuration data.

28. A computer program product comprising a non-transitory computer readable medium including program code stored thereon, the program code for communication, comprising: a computer readable medium, comprising:
- code for causing a computer to receive, at a location authentication component, a response message including location information from an access point base station via a backhaul network;
- code for causing the computer to determine if a location of the access point base station is authenticated based on the location information and corresponding location-verification data associated with a macro cell, wherein the location is authenticated if the location information includes location data that is a function of the location-verification data; and
- code for causing the computer to transmit an authentication message indicating a result of the determining, wherein the location-verification data comprises time-varying, pseudo-random data that is verifiable by the location authentication component,
wherein a rate of change of the time-varying, pseudo-random data decreases when the location of the access point base station is within a geographical area associated with the location-verification data, and
wherein the rate of change of the time-varying, pseudo-random data increases when the location of the access point base station is outside the geographical area associated with the location-verification data.

29. The computer program product of claim 28, further comprising:
code for causing the computer to generate an authentication message comprising configuration data for operating in the location if the location information corresponds to the location-verification data of the at least one macro cell; and
code for causing the computer to transmit the authentication message to the access point base station, wherein the authentication message operates to enable the access point base station for operation using the configuration data.

30. A device for communication, comprising:
means for receiving a response message including location information from an access point base station at a computer device via a backhaul network;
means for determining if a location of the access point base station is authenticated based on the location information and corresponding location-verification data associated with a macro cell, wherein the location is authenticated if the location information includes location data that is a function of the location-verification data; and
means for transmitting an authentication message indicating a result of the determining,
wherein the location-verification data comprises time-varying, pseudo-random data that is verifiable by the means for determining,
wherein a rate of change of the time-varying, pseudo-random data decreases when the location of the access point base station is within a geographical area associated with the location-verification data, and
wherein the rate of change of the time-varying, pseudo-random data increases when the location of the access point base station is outside the geographical area associated with the location-verification data.

31. The device of claim 30, further comprising:
means for generating an authentication message comprising configuration data for operating in the location if the location information corresponds to the location-verification data of the at least one macro cell; and
wherein the means for transmitting is further operable for transmitting the authentication message to the access point base station, wherein the authentication message operates to enable the access point base station for operation using the configuration data.

32. A system for communication, comprising:
a location authentication component operable to receive a response message including location information from an access point base station at a computer device via a backhaul network;
a verifier component operable to determine if a location of the access point base station is authenticated based on the location information and corresponding location-verification data associated with a macro cell, wherein the location is authenticated if the location information includes location data that is a function of the location-verification data; and
a transmitter operable to transmit an authentication message indicating a result of the determining by the verifier component,
wherein the location-verification data comprises time-varying, pseudo-random data that is verifiable by the location authentication component,
wherein a rate of change of the time-varying, pseudo-random data decreases when the location of the access point base station is within a geographical area associated with the location-verification data, and
wherein the rate of change of the time-varying, pseudo-random data increases when the location of the access point base station is outside the geographical area associated with the location-verification data.

33. The system of claim 32, wherein the authentication message is configured to allow or disallow an over-the-air transmission by the access point base station based on whether or not the location is authenticated.

34. The system of claim 32, further comprising:
a configuration component operable to generate an authentication message comprising configuration data for operating in the location if the location information corresponds to the location-verification data of the at least one macro cell; and
wherein the transmitter is further operable to transmit the authentication message to the access point base station, wherein the authentication message operates to enable the access point base station for operation using the configuration data.

35. The system of claim 32, wherein the response message further comprises an access point base station identifier, and wherein the configuration component is further operable to generate the authentication message based on confirming, according to the access point base station identifier, that the access point base station is allowed to operate in a network with the macro cell.

36. The system of claim 32, wherein the location information comprises the location-verification data.

* * * * *